(12) United States Patent
Lovlekar et al.

(10) Patent No.: US 12,745,074 B2
(45) Date of Patent: Sep. 22, 2026

(54) SCHEDULING RRC PROCESSING FOR A DUAL-SIM DUAL-ACTIVE UE

(71) Applicant: APPLE INC., Cupertino, CA (US)

(72) Inventors: Srirang A Lovlekar, Fremont, CA (US); Shrinidhi Ramachandra, Bangalore (IN); Sethuraman Gurumoorthy, San Ramon, CA (US); B. Raju A. N.V., Bangalore (IN); Ahmed Mohamed Ibrahim Hassan, Munich (DE); Amr Abdelrahman Yousef A. Mostafa, Munich (DE)

(73) Assignee: Apple Inc., Cupertino, CA (US)

( * ) Notice: Subject to any disclaimer, the term of this patent is extended or adjusted under 35 U.S.C. 154(b) by 559 days.

(21) Appl. No.: 18/189,082

(22) Filed: Mar. 23, 2023

(65) Prior Publication Data

US 2024/0323669 A1 Sep. 26, 2024

(51) Int. Cl.

| | |
|---|---|
| ***H04W 76/15*** | (2018.01) |
| ***H04W 8/18*** | (2009.01) |
| *H04W 88/06* | (2009.01) |

(52) U.S. Cl.
CPC ............ *H04W 8/183* (2013.01); *H04W 88/06* (2013.01)

(58) Field of Classification Search
None
See application file for complete search history.

(56) References Cited

U.S. PATENT DOCUMENTS

2023/0010736 A1 * 1/2023 Hebein ................ H04W 76/15

* cited by examiner

*Primary Examiner* — Gary Lafontant
(74) *Attorney, Agent, or Firm* — Flare IP PLLC

(57) ABSTRACT

Methods and apparatuses are disclosed for scheduling radio resource control (RRC) processing for a dual-SIM dual-active (DSDA) user equipment (UE) connected to a plurality of networks. In one example embodiment, a UE may be configured to implement operations including: receiving a request to process a first RRC message for a first RRC task for a first SIM card from a first network; receiving a request to process a second RRC message for a second RRC task for a second SIM card from a second network; and performing an arbitration decision to decide whether to prioritize the implementation of the first RRC task for the first SIM card or the second RRC task for the second SIM card.

22 Claims, 11 Drawing Sheets

SCHEDULING RRC PROCESSING FOR A DUAL-SIM DUAL-ACTIVE UE

FIELD OF INVENTION

This invention relates generally to the field of wireless communication, and more particularly, to methods and apparatuses for scheduling radio resource control (RRC) processing for a dual-SIM dual-active (DSDA) user equipment (UE) connected to a plurality of networks.

BACKGROUND OF THE INVENTION

In a wireless communications network, a user equipment (UE) may communicate with a base station of the network by establishing a radio link between the UE and the base station and communicate with the network. For example, in various wireless networks (implemented with 5G (NR), 4G (LTE), 3GPP, etc.), a UE may receive signaling and data from the serving base station in a downlink transmission direction or transmit signaling and data to the serving base station in an uplink transmission direction. Based upon these radio links, UEs can wirelessly communicate with the network to implement various types of services.

A Dual SIM Dual Active (DSDA) may be considered a UE (e.g., a mobile smart phone) that is capable of using two subscriber identity modules (SIMs) and two radios, so as to maintain two active voice calls or application implementations simultaneously. In a DSDA UE, usually there are two tasks handling RRC messages from two networks and both the SIMs can be in a Connected mode. Both the RRC tasks are typically running at the same priority and hence they are executed by the OS scheduler in a first come first order. In a single core design, even with two RRC tasks responsible for handling the RRC messages on the two SIMs, only one message (meant for one of the SIMs) can be handled at a time, delaying the processing of messages meant for the other SIM.

More particularly, a DSDA UE poses challenges to RRC message processing especially in 5G NR because one of the connected mode subscriptions (e.g., for a SIM) may have received a message (in uplink (UL) or downlink (DL)) and may be processing it, while the second subscription (e.g., for another SIM) also has to process a message received in DL or UL, which is of higher priority or has a deadline associated to completing its processing. However, given a single core implementation in many modems, the message processing will happen sequentially delaying the processing of the second subscription message which is more time critical.

Unfortunately, current methodologies cause the UE to be late to respond to the network and negatively impact system performance as response times are longer than the time specified by standards. Therefore, it would be beneficial to provide a method and apparatus for scheduling RRC processing in an optimized manner for a DSDA UE to alleviate the processing time delay incurred in processing the multiple messages serially and minimize the impact to user experience.

SUMMARY OF THE DESCRIPTION

Methods and apparatuses for scheduling radio resource control (RRC) processing for a dual-SIM dual-active (DSDA) user equipment (UE) connected to a plurality of networks are disclosed. In particular, methods and apparatuses for scheduling RRC processing are disclosed that operate in an optimized manner for a DSDA UE to alleviate the processing time delay incurred in processing the multiple messages serially and minimize the impact to user experience.

In one example embodiment, a method for scheduling radio resource control (RRC) processing for a dual-SIM dual-active (DSDA) user equipment (UE) connected to a plurality of networks is disclosed that comprises: receiving a request to process a first RRC message for a first RRC task for a first SIM card from a first network; receiving a request to process a second RRC message for a second RRC task for a second SIM card from a second network; and performing an arbitration decision to decide whether to prioritize the implementation of the first RRC task for the first SIM card or the second RRC task for the second SIM card.

In one embodiment, the arbitration decision implements a first-in-first-out (FIFO) process, such that, the first RRC task for the first SIM card or the second RRC task for second SIM card, received first in time, is selected for prioritization and processed first. In one embodiment, the arbitration decision implements a pre-emption based on priority process, such that, if a first RRC message for a first RRC task is being processed for the first SIM card, but a higher priority second RRC message for a second RRC task for the second SIM card is received, the first RRC message for the first RRC task is pre-empted, and the higher priority second RRC message for the second RRC task for the second SIM card is processed. It should be noted that the processing of the first RRC message in the first RRC task is resumed after completion of handling of the second RRC message in the second RRC task. In one embodiment, the arbitration decision implements a pre-emption based on RRC message size process, such that, if a first RRC message for a first RRC task is being processed for the first SIM card, but a larger size second RRC message for a second RRC task for the second SIM card is received, the first RRC message for the first RRC task is pre-empted, and the larger size second RRC message for the second RRC task for the second SIM card is processed. In one embodiment, the arbitration decision implements a pre-emption based on the application being run on the first or second SIM, such that, if a first RRC message for a first RRC task is being processed for the first SIM card, but a second RRC message for a second RRC task for a higher priority application being run on the second SIM card is received, the first RRC message for the first RRC task is pre-empted, and the second RRC message for the second RRC task for the higher priority application being run on the second SIM card is processed. In one embodiment, the higher priority application includes at least one of (but not limited to): an emergency call, a mobility operation, an ultra-reliable low latency (uRLLC) operation, RLF recovery etc. In one embodiment, the arbitration decision implements a network-based priority process, wherein the first or second network includes a priority indicator with the first or second RRC message, respectively, such that, if a first RRC message for a first RRC task is being processed for the first SIM card, but a second RRC message with higher priority indicator for a second RRC task for the second SIM card is received, the first RRC message for the first RRC task is pre-empted, and the higher priority second RRC message for the second RRC task for the second SIM card is processed. In one embodiment, priority indicators for first or second RRC messages are based on at least one of size, priority content, or application. Another option would be to prioritize based on the logical channel type on which the received message is mapped (e.g., DCH vs BCH). In one embodiment, priority indicators for first or second RRC messages are added to the signaling radio bearer (SRB) service data unit (SDU) as part of the packet data convergence protocol (PDCP) header.

In one embodiment, the first and second RRC messages from the first and second network, respectively, each comprise a profile based RRC reconfiguration message including a profile ID that includes pre-defined and known components by the UE. In one embodiment, when the first and second RRC messages from the first and second network, respectively, are both UE Capability Enquiries, received at the same time of back to back (i.e when first RRC message is being processed while second is being received), and both the first and second network are the same network operators, then the arbitration decision selects one of the first or second SIM cards to process the UE Capability Enquiry and determine the UE capability information, and the UE capability information is transmitted to the other SIM card, such that both SIM cards transport the UE capability information back to their respective networks. In one embodiment, when the first and second RRC messages from the first and second network, respectively, are both UE Connection Establishment Requests, received at the same time, and both the first and second network are different network operators, then the arbitration decision selects one of the first or second SIM cards to process the UE Connection Establishment Request and determine the UE capability information for the selected SIM card to be sent to the network, while suspending the processing of the UE Connection Establishment Request for the other SIM card for the other network.

In another embodiment, a dual-SIM dual-active (DSDA) user equipment (UE) connected to a plurality of networks for scheduling radio resource control (RRC) processing is disclosed. The DSDA UE comprises: at least one antenna; at least one radio, wherein the at least one radio is configured to communicate with the network including a base station using at least one antenna; and at least one processor coupled to at least one radio and a first SIM card and a second SIM card, wherein at least one processor is configured to perform operations including: receiving a request to process a first RRC message for a first RRC task for a first SIM card from a first network; receiving a request to process a second RRC message for a second RRC task for a second SIM card from a second network; and performing an arbitration decision to decide whether to prioritize the implementation of the first RRC task for the first SIM card or the second RRC task for the second SIM card.

In one embodiment, the arbitration decision implements a first-in-first-out (FIFO) process, such that, the first RRC task for the first SIM card or the second RRC task for second SIM card, received first in time, is selected for prioritization and processed first. In one embodiment, the arbitration decision implements a pre-emption based on priority process, such that, if a first RRC message for a first RRC task is being processed for the first SIM card, but a higher priority second RRC message for a second RRC task for the second SIM card is received, the first RRC message for the first RRC task is pre-empted, and the higher priority second RRC message for the second RRC task for the second SIM card is processed. In one embodiment, the arbitration decision implements a pre-emption based on RRC message size process, such that, if a first RRC message for a first RRC task is being processed for the first SIM card, but a larger size second RRC message for a second RRC task for the second SIM card is received, the first RRC message for the first RRC task is pre-empted, and the larger size second RRC message for the second RRC task for the second SIM card is processed. In one embodiment, the arbitration decision implements a pre-emption based on the application being run on the first or second SIM, such that, if a first RRC message for a first RRC task is being processed for the first SIM card, but a second RRC message for a second RRC task for a higher priority application being run on the second SIM card is received, the first RRC message for the first RRC task is pre-empted, and the second RRC message for the second RRC task for the higher priority application being run on the second SIM card is processed. In one embodiment, the higher priority application includes at least one an emergency call, a mobility operation, or an ultra-reliable low latency (uRLLC) operation. In one embodiment, the arbitration decision implements a network-based priority process, wherein the first or second network includes a priority indicator with the first or second RRC message, respectively, such that, if a first RRC message for a first RRC task is being processed for the first SIM card, but a second RRC message with higher priority indicator for a second RRC task for the second SIM card is received, the first RRC message for the first RRC task is pre-empted, and the higher priority second RRC message for the second RRC task for the second SIM card is processed. In one embodiment, priority indicators for first or second RRC messages are based on at least one of size, priority content, or application. In one embodiment, priority indicators for first or second RRC messages are added to the signaling radio bearer (SRB) service data unit (SDU) as part of the packet data convergence protocol (PDCP) header.

In one embodiment, the first and second RRC messages from the first and second network, respectively, each comprise a profile based RRC reconfiguration message including a profile ID that includes pre-defined and known components by the UE. In one embodiment, when the first and second RRC messages from the first and second network, respectively, are both UE Capability Enquiries, received at the same time of back to back such that the first RRC message is being processed while the second one is received, and both the first and second network are the same network operators, then the arbitration decision selects one of the first or second SIM cards to process the UE Capability Enquiry and determine the UE capability information, and the UE capability information is transmitted to the other SIM card, such that both SIM cards transport the UE capability information back to their respective networks. In one embodiment, when the first and second RRC messages from the first and second network, respectively, are both UE Connection Establishment Requests, received at the same time, and both the first and second network are different network operators, then the arbitration decision selects one of the first or second SIM cards to process the UE Connection Establishment Request and determine the UE capability information for the selected SIM card to be sent to the network, while suspending (delaying) the processing of the UE Connection Establishment Request for the other SIM card for the other network, until the connection establishment on the first SIM has reached a certain stage, as will be described.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "some embodiments" or "an embodiment" means that a particular feature, structure, or characteristic described in connection with the embodiment can be included in at least one embodiment of the invention. The appearances of the phrase "in some embodiments" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

Figure 1:
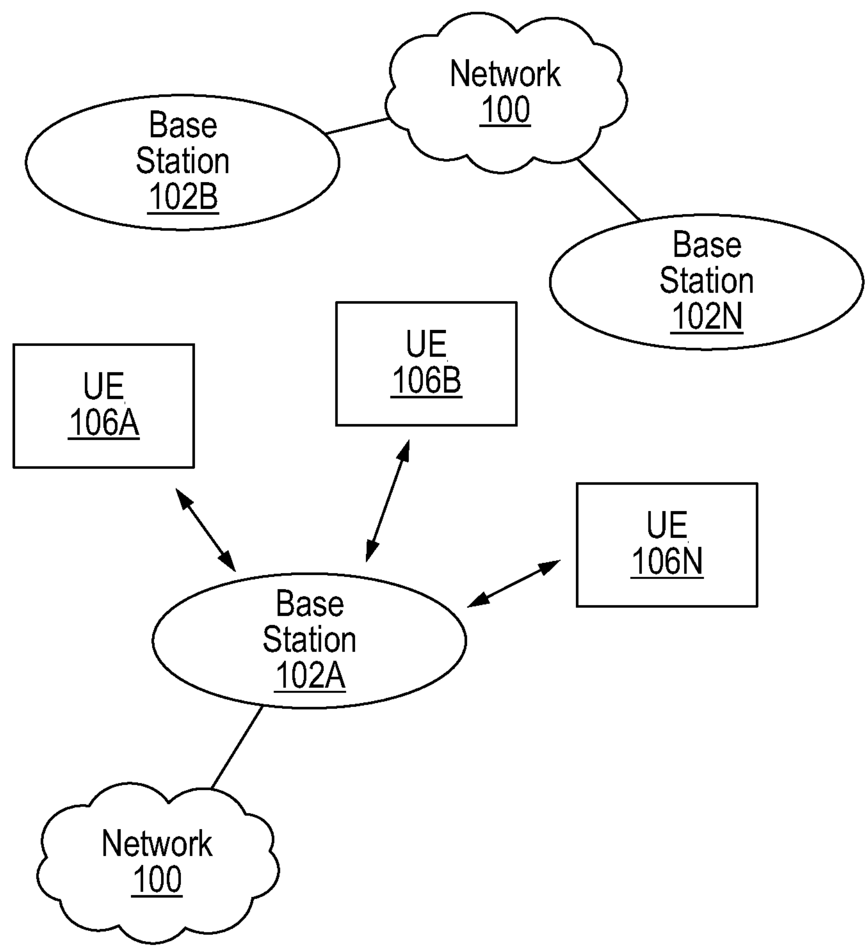
FIG. 1 illustrates an example wireless communication system according to one embodiment of the disclosure.

FIG. 1 illustrates a simplified example wireless communication system according to one aspect of the disclosure. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
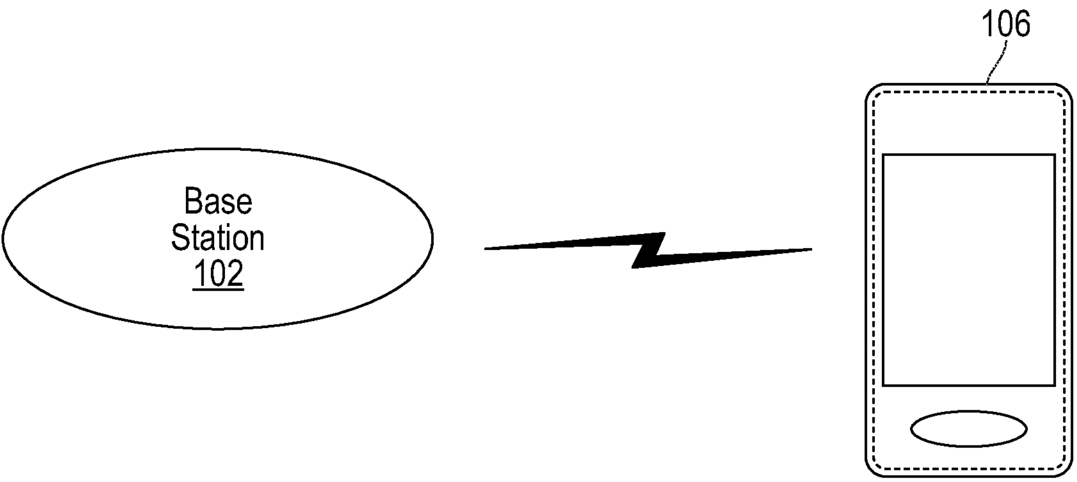
FIG. 2 illustrates user equipment in direct communication with a base station (BS) according to one embodiment of the disclosure.

FIG. 2 illustrates a UE 106 in direct communication with a base station 102 through uplink and downlink communications according to one aspect of the disclosure. The UE 106 may be a device with cellular communication capability such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method) embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTTor LTE or GSM), and separate radios for communicating using each of Wi-Fi and Bluetooth. Other configurations are also possible.

Figure 3:
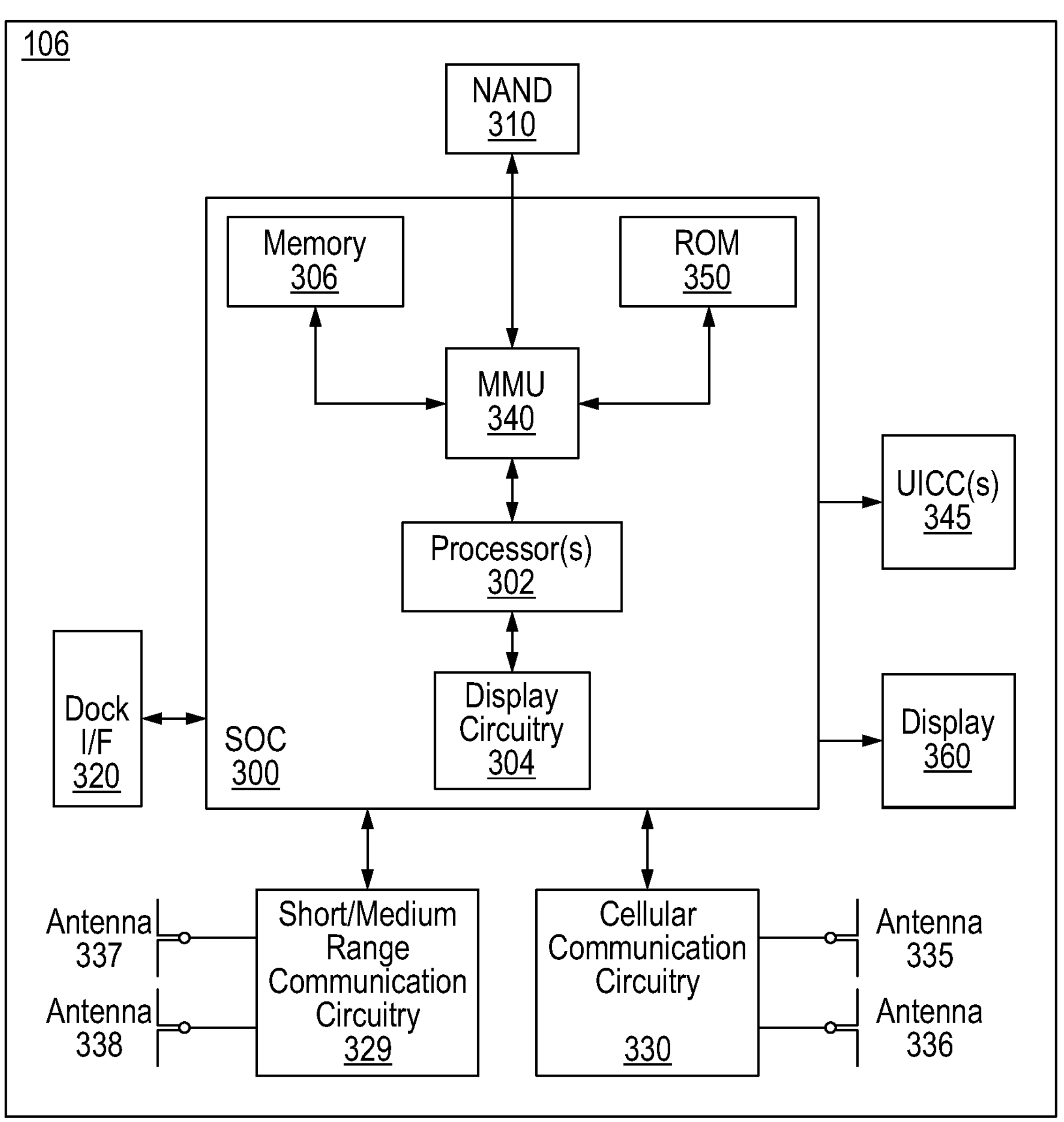
FIG. 3 illustrates an example block diagram of a UE according to one embodiment of the disclosure.

FIG. 3 illustrates an example simplified block diagram of a communication device 106 according to one aspect of the disclosure. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash memory 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple radio access technologies (RATs) (e.g., a first receive chain for LTE and a second receive chain for 5G NR). In addition, in some embodiments, cellular communication circuitry 330 may include a single transmit chain that may be switched between radios dedicated to specific RATs.

For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may also be configured to determine a physical downlink shared channel scheduling resource for a user equipment device and a base station. Further, the communication device 106 may be configured to group and select CCs (component carriers) from the wireless link and determine a virtual CC from the group of selected CCs. The wireless device may also be configured to perform a physical downlink resource mapping based on an aggregate resource matching patterns of groups of CCs.

As described herein, the communication device 106 may include hardware and software components for implementing the above features for determining a physical downlink shared channel scheduling resource for a communications device 106 and a base station. The processor 302 of the communication device 106 may be configured to implement part or all of the features described herein, e.g., by executing program instructions stored on a memory medium (e.g., a non-transitory computer-readable memory medium). Alternatively, (or in addition), processor 302 may be configured as a programmable hardware element, such as an FPGA (Field Programmable Gate Array), or as an ASIC (Application Specific Integrated Circuit). Alternatively, (or in addition), the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
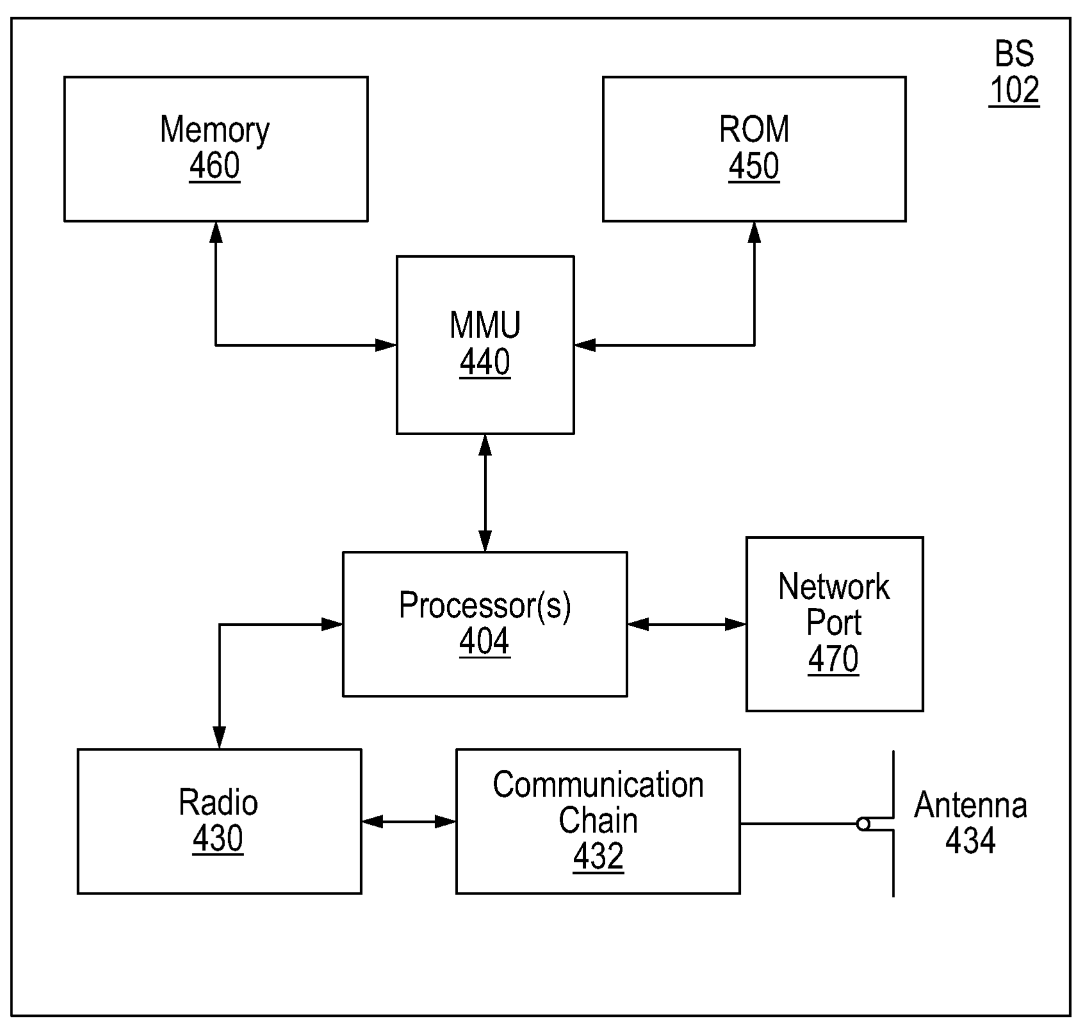
FIG. 4 illustrates an example block diagram of a BS according to one embodiment of the disclosure.

FIG. 4 illustrates an example block diagram of a base station 102 according to one aspect of the disclosure. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UEs 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UEs 106. In some cases, the network port 470 may couple to a telephone network via the core network, and/or the core network may provide a telephone network (e.g., among other UEs serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UEs 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively, (or in addition), the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
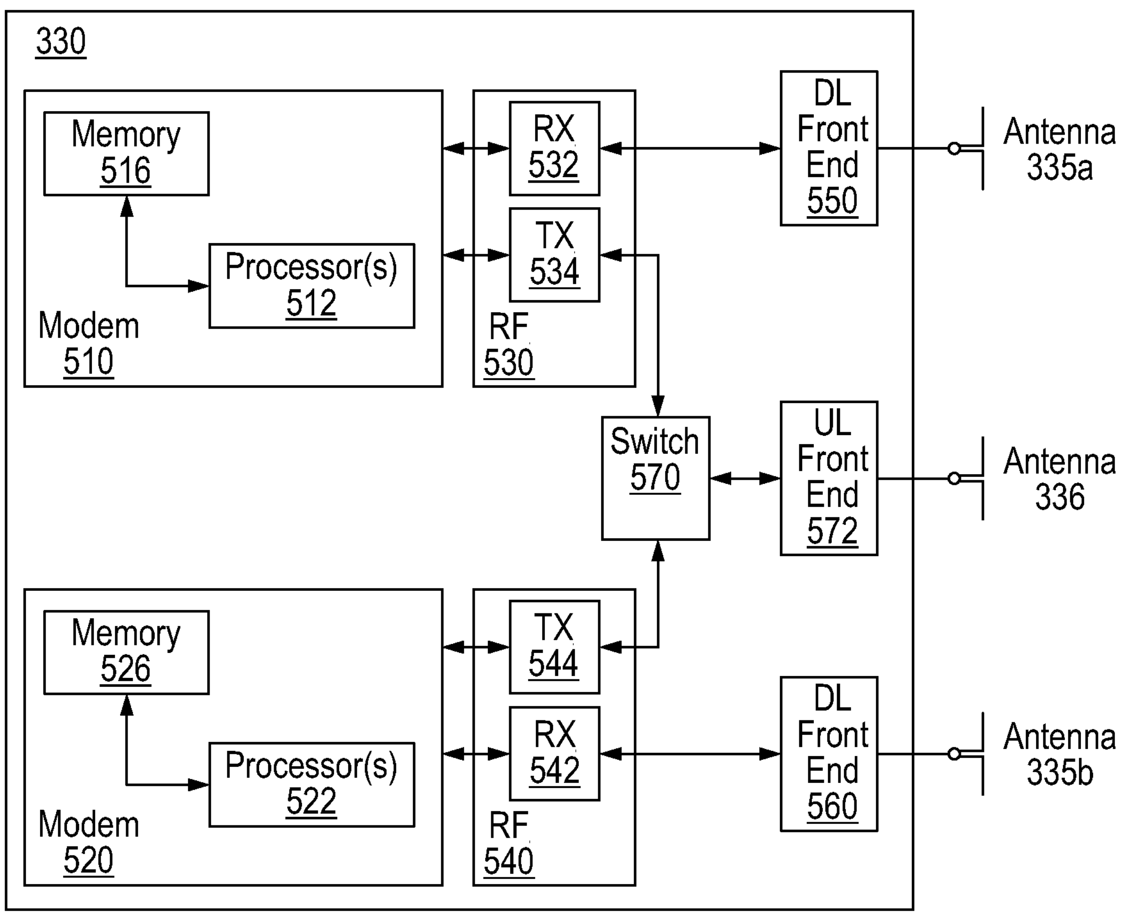
FIG. 5 illustrates an example block diagram of cellular communication circuitry according to one embodiment of the disclosure.

FIG. 5 illustrates an example simplified block diagram of cellular communication circuitry according to one aspect of the disclosure. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335 *a-b* and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

As described herein, the modem 510 may include hardware and software components for implementing the above features or for selecting a periodic resource part for a user equipment device and a base station, as well as the various other techniques described herein. The processors 512 may be configured to implement part or all of the features described herein, e.g., by executing program instructions stored on a memory medium (e.g., a non-transitory computer-readable memory medium). Alternatively, (or in addition), processor 512 may be configured as a programmable hardware element, such as an FPGA (Field Programmable Gate Array), or as an ASIC (Application Specific Integrated Circuit). Alternatively, (or in addition), the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for selecting a periodic resource on a wireless link between a UE and a base station, as well as the various other techniques described herein. The processors 522 may be configured to implement part or all of the features described herein, e.g., by executing program instructions stored on a memory medium (e.g., a non-transitory computer-readable memory medium). Alternatively, (or in addition), processor 522 may be configured as a programmable hardware element, such as an FPGA (Field Programmable Gate Array), or as an ASIC (Application Specific Integrated Circuit). Alternatively, (or in addition), the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

As has been described, a Dual SIM Dual Active (DSDA) may be considered a UE (e.g., a mobile smart phone) that is capable of using two subscriber identity modules (SIMs) and two radios, so as to maintain two active voice calls or application implementations simultaneously. In a DSDA UE, usually there are two tasks handling RRC messages from two networks and both the SIMs can be in Connected mode. In prior implementations, both the RRC tasks are typically running at the same priority and hence they are executed by the OS scheduler in a first come first order, such that, even with two, RRC tasks responsible for handling the RRC messages on the two SIMs, only one message (meant for one of the SIMs) can be handled at a time, delaying the processing of messages meant for the other SIM. More particularly, in prior implementations, a DSDA UE poses challenges to RRC message processing especially in 5G NR because one of the connected mode subscriptions (e.g., for a SIM) may have received a message (in uplink (UL) or downlink (DL)) and may be processing it, while the second subscription (e.g., for another SIM) also has to process a message received in DL or UL, which is of higher priority or has a deadline associated to completing its processing. However, given a single core implementation in many existing modems, the message processing will happen sequentially delaying the processing of the second subscription message which is more time critical.

Further, in existing DSDA UEs, usually there are two tasks handling RRC messages from two networks and both the SIMs can be in Connected mode, and both the RRC tasks are running at same priority and hence they are executed by the OS scheduler in first come first order. When in Connected mode, the NW can send DL RRC messages at the same time to the two SIMs depending on context/situation the SIMs are in and, similarly, a UE may have UL messages (e.g., like Measurement report) that can be triggered in sequence but get queued up at RRC for processing at same time. The RRC might receive a DL message on one SIM and a UL message on the other SIM, one message will be queued until the other message is handled. Therefore, issues arise as to how should RRC processing occur for messages that are received at the same time on a single core CPU to meeting processing time requirements (e.g., 3GPP). For example, there are many timing requirements dictated by Specifications (e.g., 3GPP) for a single SIM scenario. However, the same timing requirements are expected for dual SIMs and DSDA UEs (which, are even more challenging). Examples of timing requirements from the 3GPP Specification are shown below:

| Procedure title: | Network -> UE | UE -> Network | Value [ms] | Notes |
|---|---|---|---|---|
| | | RRC Connection Control Procedures | | |
| RRC reconfiguration | RRCReconfiguration | RRCReconfigurationComplete | 10 | |
| RRC reconfiguration (scell addition/release) | RRCReconfiguration | RRCReconfigurationComplete | 16 | |
| RRC reconfiguration (LTE/NR SCG establishment/modification/release) | RRCReconfiguration | RRCReconfigurationComplete | 16 | |
| RRC reconfiguration (Intra-NR mobility with LTE/NR SCG establishment/modification/release) | RRCReconfiguration | RRCReconfigurationComplete | 16 | |
| RRC reconfiguration | DLDedicatedMessage Segment | RRCReconfigurationComplete | 16 + (Nseg − 1)*10 | Nseg is number of RRC segments |
| RRC setup | RRCSetup | RRCSetupComplete | 10 | |
| RRC Release | RRCRelease | | NA | |
| RRC re-establishment | RRCReestablishment | RRCReestablishmentComplete | 10 | |
| | | Other procedures | | |
| UE assistance information | | UEAssistanceInformation | NA | |
| UE capability transfer | UECapabilityEnquiry | UECapabilityInformation | 80 | |
| Counter check | CounterCheck | CounterCheckResponse | 5 | |
| UE information | UEInformationRequest | UEInformationResponse | 15 | |
| DL information transfer MR-DC | DLInformationTransfer MRDC | | NA | The UE shall apply the performance requirements of the RRC message |

-continued

| Procedure title: | Network -> UE | UE -> Network | Value [ms] | Notes |
|---|---|---|---|---|
| | | | | included within the DLInformationTransfer MRDC message. |
| IAB other information | | IABOtherInformation | NA | |
| Sidelink UE information | | SidelinkUEInformationNR | NA | |
| UE Positioning assistance information | | UEPositioningAssistanceInfo | NA | |

It should be noted that there is no leniency from 3GPP specifications to relax requirements for a dual SIM device. In many cases, the timing requirements are already tight for the single SIM. Hence problems are further compounded and pronounced in a DSDA case as sequential processing of the two messages results in delayed processing of message that is processed next after first message is processed. Unfortunately, current methodologies cause the UE to be late to respond to the network and negatively impact system performance as response times are longer than the time specified by standards.

Therefore, it would be beneficial to provide a method and apparatus for scheduling RRC processing in an optimized manner for a DSDA UE to alleviate the processing time delay incurred in processing the multiple messages serially and minimize the impact to user experience. Methods and apparatuses for scheduling radio resource control (RRC) processing for a dual-SIM dual-active (DSDA) user equipment (UE) connected to a plurality of networks are disclosed. In particular, methods and apparatuses for scheduling RRC processing are disclosed that operate in an optimized manner for a DSDA UE to alleviate the processing time delay incurred in processing the multiple messages serially and minimize the impact to user experience.

Figure 6A:
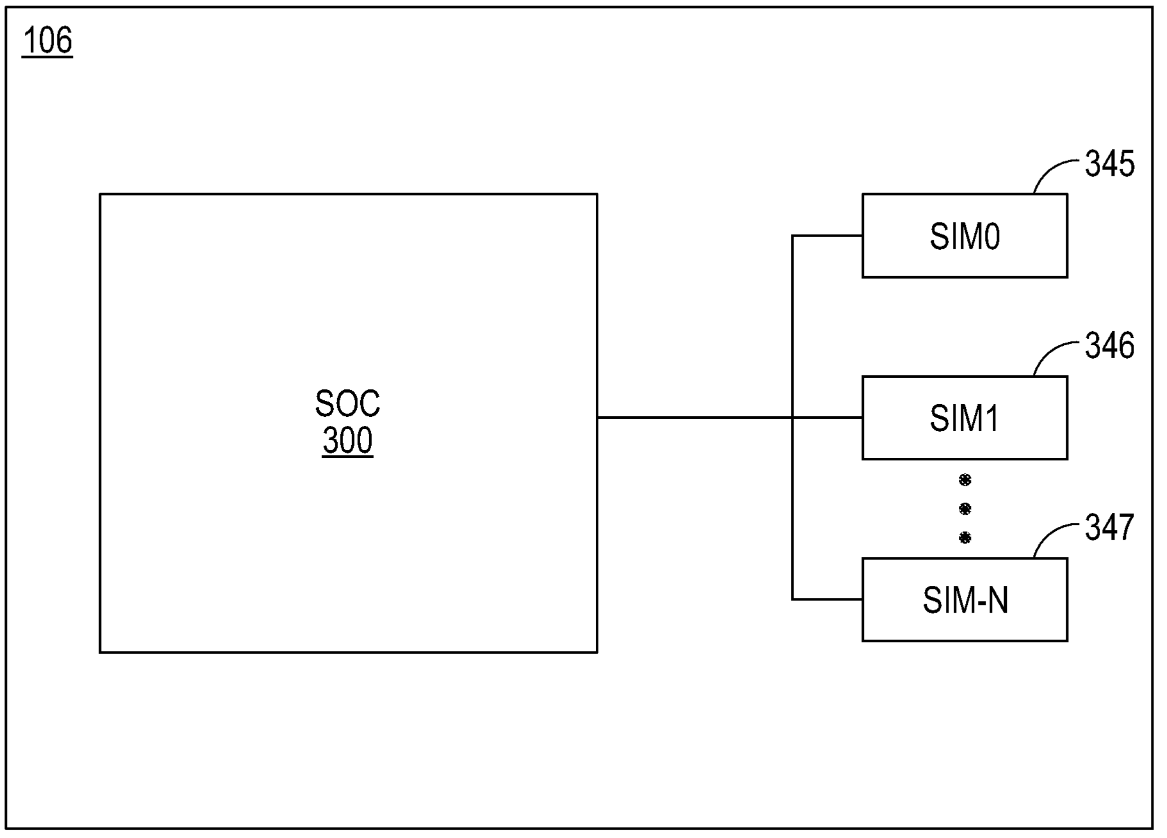
FIG. 6A illustrates an example diagram of dual-SIM dual-active (DSDA) user equipment (UE) including multiple SIMs according to one embodiment of the disclosure.

With additional reference to FIG. 6A, in one example embodiment, a dual-SIM dual-active (DSDA) user equipment (UE) 106 connected to a plurality of networks (100, 101, etc.) is disclosed that can implement scheduling radio resource control (RRC) processing. In this embodiment, the previously described SOC 300 of the UE 106 may include a processor 302 that performs operations including: receiving a request to process a first RRC message for a first RRC task for a first SIM card 345 (SIM0) from a first network 100; receiving a request to process a second RRC message for a second RRC task for a second SIM card (SIM1) 346 from a second network 101; and, as will be described in more detail hereafter, performing an arbitration decision to decide whether to prioritize the implementation of the first RRC task for the first SIM card (SIM0) 346 or the second RRC task for the second SIM card (SIM1) 346.

As has been described, in one example embodiment, UE 106 may be a DSDA UE 106 including multiple SIM cards (345, 346, 347, etc.) to connect to one or more networks 100, 101, etc. In this example embodiment implementation, DSDA UE 106 may include SIM0 345 and SIM1 346 and may communicate with networks 100 and 101. As has been described, UE 106 may communicate through base station (s) to networks 100, 101 (e.g., a core network of a cellular service provider, a telecommunication network such as a public switched telephone network (PSTN), and/or the Internet, among various possibilities) and the base stations may facilitate communication between the user devices and/or between the user devices and the network. In particular, a cellular base station may provide a UE 106 with various telecommunication capabilities, such as voice, SMS and/or data services. As has been described the UE 106 may include: at least one antenna; at least one radio, wherein the at least one radio is configured to communicate with a network including a base station using the at least one antenna. The UE 106 may further include a SOC 300 with a core processor 302 to implement many of the functions to be hereafter described. In this example, the DSDA UE 106 may include SIM0 card 345 and SIM1 card 346 and be in communication with networks 100 and 101, but other implementations may include additional SIM cards and networks.

Figure 6B:
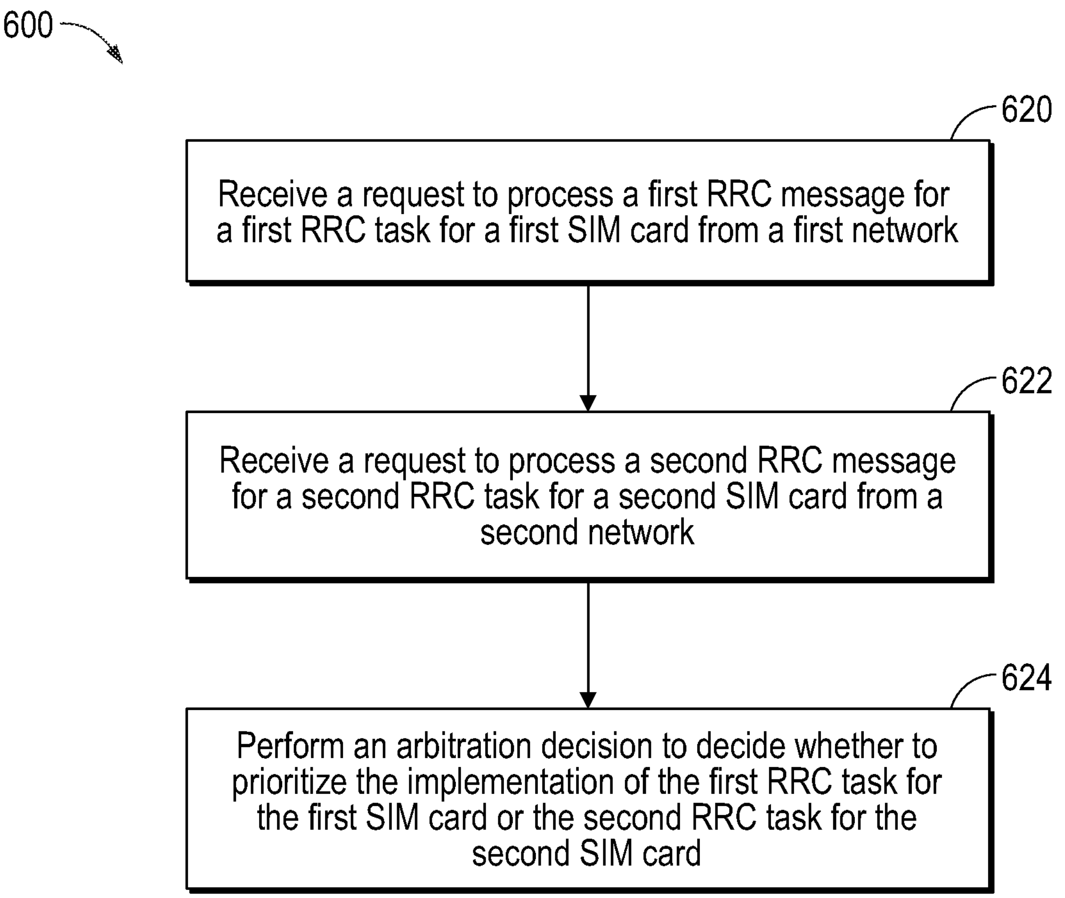
FIG. 6B illustrates an example flow diagram of a process for scheduling prioritized radio resource control (RRC) processing for a DSDA UE according to one embodiment of the disclosure.

With brief additional reference to FIG. 6B, a process 600 is shown for scheduling radio resource control (RRC) processing for a dual-SIM dual-active (DSDA) user equipment (UE) 106 connected to a plurality of networks 100, 101 that comprises: receiving a request to process a first RRC message for a first RRC task for a first SIM card 345 from a first network 100 (block 620); receiving a request to process a second RRC message for a second RRC task for a second SIM card 346 from a second network 101 (block 622); and performing an arbitration decision to decide whether to prioritize the implementation of the first RRC task for the first SIM card or the second RRC task for the second SIM card (block 624).

Various implementation operations will be described hereafter that can be used independently or in a combined manner to alleviate the processing time delay incurred in processing the messages serially and minimize the impact to user experience. In particular, an arbitration function will be described that utilizes proposed prioritization methods to determine which SIM's message should be processed first. These arbitration implementations optimize the processing time by reusing the response created for one of the SIMs and applies it to the other SIM, in case both SIMs belong to same carrier, and when both SIMs have to transmit the same response to the network. One implementation describes network-based options wherein the network can signal the priority of the processing in the DL RRC messages enabling UE-RRC to pre-empt processing of RRC message received on other SIM. A further implementation, leverages the profile ID based reconfiguration signaling method to reduce the time by reducing the size of message and processing required thereof by using the configuration stored in the UE.

Figure 6C:
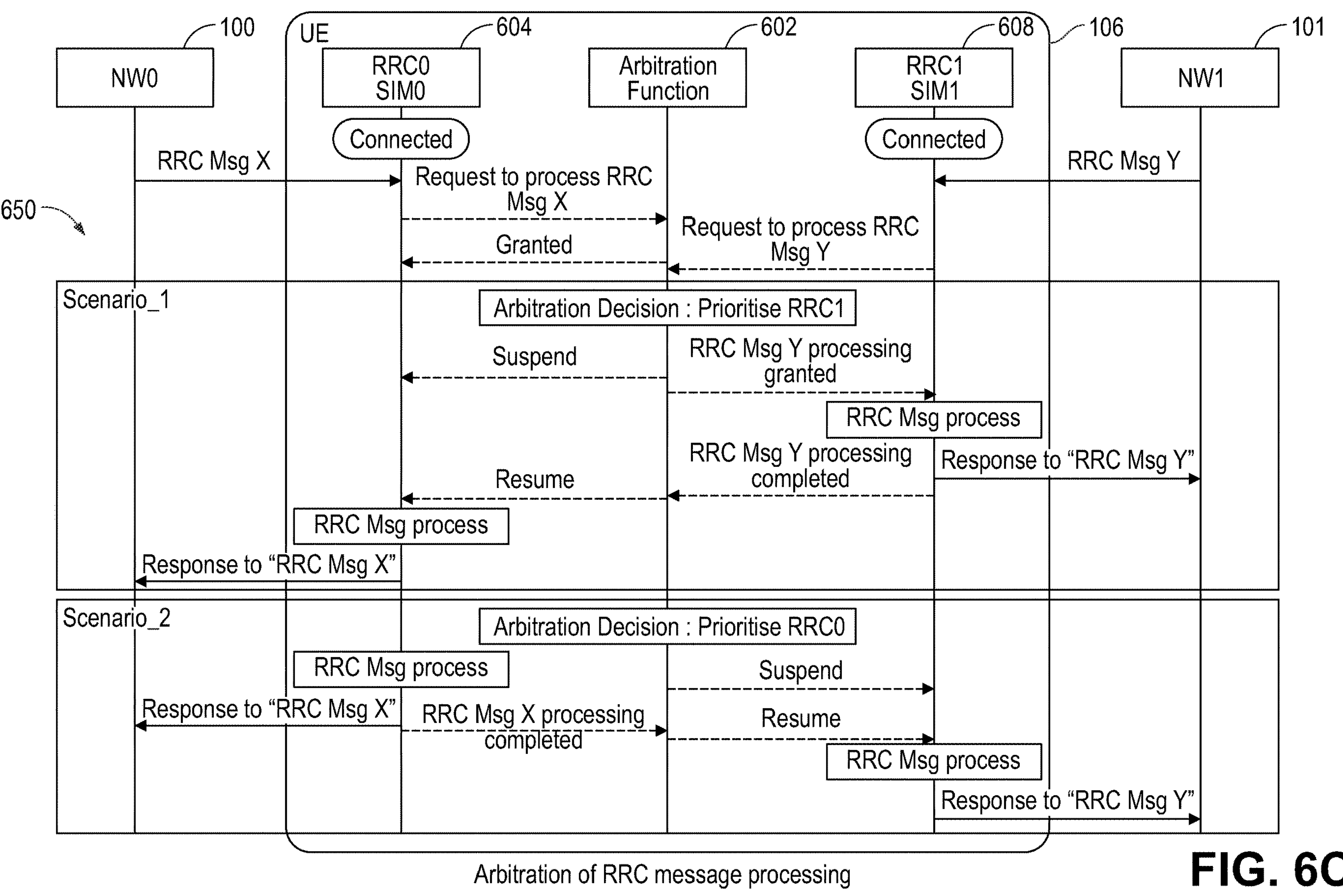
FIG. 6C illustrates an example diagram of a process for arbitration of RRC messaging according to one embodiment of the disclosure.

With reference to FIG. 6C, a method process 650 for arbitration of RRC messaging is described. In one embodiment, the arbitration process 650 implemented by the processor of the DSDA UE 106 performs an arbitration decision to decide whether to prioritize the implementation of the first RRC task for the first SIM card 604 (e.g., Scenario 1) or the second RRC task for the second SIM card 608 (e.g., Scenario 2).

As shown in FIG. 6C, both SIM cards—RRC0 SIM0 604 and RRC1 SIM1 608—of the DSDA UE 106—are in a Connected State—with respective Networks—NW0 100 and NW1 101, respectively. RRC0 SIM0 604 receives a RRC message X from NW0 100 and RRC1 SIM1 608 receives a RRC message Y from NW1 101. As will be described, the RRC SIMs 604 and 608 inform the Arbitration Function 602 and obtain approval before processing the RRC message. As shown in FIG. 6C, RRC0 SIM0 604 makes a request to process RRC Msg X and RRC1 SIM1 608 makes a request to process RRC Msg Y. The Arbitration Function 602 performs an arbitration decision to decide whether to prioritize the implementation of the first RRC task for the first SIM card 604 (e.g., Scenario 1) or the second RRC task for the second SIM card 608 (e.g., Scenario 2), based upon a number of different factors, as will be described. An example, of how the arbitration function 602 operates will be described, as an example. As an example, arbitration function 602 grants the request to process RRC SIM0 604.

Then, as one example, if Arbitration Function 602, makes an arbitration decision to prioritize RRC SIM1 608 (Scenario 1), then RRC SIM0 604 is suspended and RRC Msg Y processing is granted to RRC SIM1 608 and RRC SIM1 608 proceeds with the RRC Msg process, and a Response to RRC Msg Y is transmitted back to NW1 101 and an RRC Msg Y processing complete is transmitted to Arbitration Function 602. Arbitration Function 602 then commands RRC SIM0 604 to Resume its RRC Msg processing and RRC SIM0 604 then transmits its response to RRC Msg X to NW0 100.

If Arbitration Function 602, makes an arbitration decision to prioritize RRC SIM0 604 (Scenario 2), then RRC SIM 1.608 is suspended and RRC SIM0 604 proceeds with the RRC Msg process, a Response to RRC Msg X is transmitted back to NW0 100 and an RRC Msg X processing complete is transmitted. Arbitration Function 602 then commands RRC SIM1 608 to Resume its RRC Msg processing and RRC SIM1 608 then transmits its response to RRC Msg Y to NW1 101.

As can be seen by this process, the Arbitration Function 602 can suspend ongoing RRC processing to prioritize another RRC instance and the Arbitration Function 602 can suspend tasks by using any simple method (e.g., explicit signaling) to reduce the task priority. Arbitration decisions can be made based upon numerous factors, such as, but not limited to the following: received RRC Msg type (e.g., if it is RRC reconfiguration or RRC Release and whether RRC reconfiguration contains hand over (HO) commands, etc.); Estimation of time needed to process RRC message based on the message size; NW provided priority; Voice connected SIM; Data connected SIM; Time budget available to respond to message; etc. Various factors for arbitrations decisions will be described in more detail hereafter.

Figure 7:
FIG. 7 illustrates an example block diagram illustrating factors that may be utilized for arbitration decisions by the arbitration function according to one embodiment of the disclosure.
Figure 7:
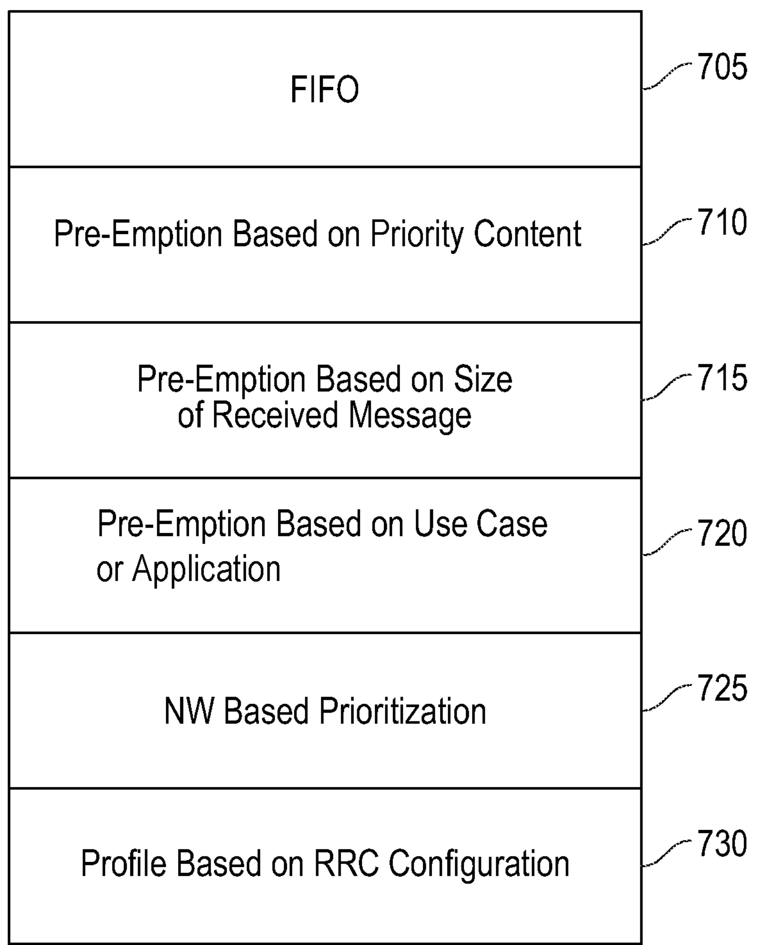

With additional reference to FIG. 7, a block diagram illustrating factors that may be utilized for arbitration decisions by the arbitration function. As can be seen in FIG. 7, these include: FIFO 705; Pre-Emption Based on Priority Content 710; Pre-Emption Based on Size of Received Message 715; Pre-Emption Based on Use Case or Application 720; NW Based Prioritization 725; Profile Based on RRC Configuration.

In one embodiment, the arbitration function 602 implements an arbitration decision that is based on a first-in-first-out (FIFO) process 705, such that, the first RRC task for the first SIM card 604 or the second RRC task for second SIM card 608, received first in time, is selected for prioritization and is processed first. In this implementation, the non-selected RRC task for the non-selected SIM card is suspended, while the selected RRC task for the selected SIM card is processed, as previously described.

In some example implementations, in this method, the RRC processes the message that is received first. For example, if SIM0 604 receives (unsegmented) RRC reconfiguration at time TO and SIM1 608 receives unsegmented RRC reconfiguration at time T1, then RRC processes the SIM0 message first and after it is processed, then handles the SIM1 message.

In some example implementations, there are two possibilities for handling segmented DL messages. In Option_1: If SIM0 604 has received 2 segments (of total 5) on SIM0 and SIM1 608 receives an unsegmented RRC reconfiguration message (or all segments of the segmented message are received), then UE 106 will process the RRC reconfiguration message received on SIM1 and then handle RRC reconfiguration on SIM0 after all segments are received. In Option_2: Another method is to wait for remaining segments of RRC reconfiguration to be received on SIM0 604 and keep RRC Reconfiguration received on SIM1 608 pending and upon receiving all segments of RRC Reconfiguration on SIM0, process SIM0's RRC Reconfiguration first and then process RRC Reconfiguration on SIM1.

In one embodiment, the arbitration function 602 implements an arbitration decision that is based on a pre-emption based on a priority content process 710, such that, if a first RRC message for a first RRC task is being processed for the first SIM card 604, but a higher priority second RRC message for a second RRC task for the second SIM card 608 is received, the first RRC message for the first RRC task is pre-empted (e.g., suspended), and the higher priority second RRC message for the second RRC task for the second SIM card is processed. In this implementation, the lower priority RRC task for the first SIM card is suspended, while the higher priority RRC task for the second SIM card is processed, as previously described.

Therefore, this message handling is based on content of the received message. In this example method, if SIM0 604 receives the RRC Reconfiguration from the NW 100 and the RRC task of SIM0 is in the middle of validating the message, but at the same time, lower layer of SIM1 delivers a signal radio bearer (SRB1) message to SIM1's RRC task, then the RRC task of SIM1 608 will decode the received SRB1 message and if it contains a higher priority configuration, e.g., like handover configuration then, UE 106 will pre-empt the processing of RRC Reconfiguration message received on SIM0 (provided it has lower priority configuration like for example RRC Release) and processes the RRC Reconfiguration received on SIM1. Once SIM1's RRC Reconfiguration processing is done, then UE 106 will resume the processing of SIM0's RRC Reconfiguration.

In one embodiment, the arbitration function 602 implements an arbitration decision that is based upon a pre-emption that is based on an RRC message size process 715, such that, if a first RRC message for a first RRC task is being processed for the first SIM card 604, but a larger size second RRC message for a second RRC task for the second SIM card 608 is received, the first RRC message for the first RRC task is pre-empted (e.g., suspended), and the larger size second RRC message for the second RRC task for the second SIM card is processed. In this implementation, the RRC task for the first SIM card with the smaller sized RRC message is suspended, while the RRC task for the second SIM card with the larger size second RRC message is processed, as previously described.

As one example method, if SIM0 604 receives the RRC Reconfiguration from the NW 100 and it is in middle of validating the message, but at the same time, lower layer of SIM1 608 delivers an SRB1 message to SIM1's 608 RRC task, then depending on the size of the RRC messages received on SIM0 and SIM1, RRC will process the message that is larger in size, based upon the arbitration function 602 making an arbitration decision. As an example, if the size of the RRC Reconfiguration received on SIM0 is smaller than the one received on SIM1, then UE 106 will pre-empt the processing of RRC Reconfiguration received on SIM0 and command the processing of the RRC Reconfiguration received on SIM1, and after processing of SIM1's RRC Reconfiguration is complete, command resuming the processing of SIM0's RRC Reconfiguration.

In one embodiment, the arbitration function 602 implements an arbitration decision that is a pre-emption based on a use case 720 (e.g., type of application being run) on the first SIM 604 or the second SIM 608, such that, if a first RRC message for a first RRC task is being processed for the first SIM card, but a second RRC message for a second RRC task for a higher priority application being run on the second SIM card is received, the first RRC message for the first RRC task is pre-empted (e.g., suspended) and the second RRC message for the second RRC task for the higher priority application being run on the second SIM card is processed. In this implementation, the RRC task for the first SIM card associated with the lower priority application is suspended, while the RRC task for the second SIM card with the lower priority application is processed, as previously described.

It should be appreciated that the pre-emption may be based on the type of application or any use case 720. In this method, prioritization may be based on the application (e.g., use case) that is running on the individual SIM. As an example, when SIM0 604 is in the connected mode due to a background application requiring data transfer and SIM1 608 is in connected mode for mobile originated (MO) or MT voice call, then in this case if SIM0 receives the RRC Reconfiguration first and, while it is processing it, SIM1 receives a DL SRB1 SDU, then UE 106 will pre-empt the processing of RRC Reconfiguration message on SIM0, and process the RRC Reconfiguration received on SIM1, and after RRC Reconfiguration on SIM1 processing is completed, will resume the processing of RRC Reconfiguration on SIM0. Other use cases may be a mobility procedure (e.g., that involves signaling only from higher layers), a ultra-reliable low latency communication (uRLLC) session-such as an augmented reality (AR)/virtual reality (VR) application, emergency calls that are higher priority compared to other services running on the second SIM, etc. Therefore, in one embodiment, the higher priority application may include at least one of (but not limited to): an emergency call, a mobility operation, or an ultra-reliable low latency (uRLLC) operation.

In one embodiment, the arbitration function 602 implements an arbitration decision that is a network-based priority process 725, wherein, the first or second network 100, 101 includes a priority indicator with the first or second RRC message, respectively, such that, if a first RRC message for a first RRC task is being processed for the first SIM card 604, but a second RRC message with higher priority indicator for a second RRC task for the second SIM card 608 is received, the first RRC message for the first RRC task is pre-empted (e.g., suspended), and the higher priority second RRC message for the second RRC task for the second SIM card is processed. In one embodiment, priority indicators for first or second RRC messages are based on at least one of size, priority content, or application. In one embodiment, priority indicators for first or second RRC messages are added to the signaling radio bearer (SRB) service data unit (SDU) as part of the packet data convergence protocol (PDCP) header. In this implementation, the RRC task for the first SIM card associated with the lower priority indicator is suspended, while the RRC task for the second SIM card with the higher priority indicator is processed, as previously described.

Therefore, as previously described, in this method, a NW (100, 101) can assign a priority based on the urgency to process the DL RRC reconfiguration for a DSDA UE and indicate to the UE in which priority it has to process the message. NW can assign higher priority to messages based on the size, content or the scenario/use case in which NW has sent the message. The priority indicator can be added to the SRB1 SDU as part of the PDCP header so that way RRC does not have to decode the entire RRC message and can pre-empt an already received RRC message processing to process the newly received higher priority PDCP SRB1 SDU. If the NW assigns a Normal priority, then it is left up to the UE implementation as to which order the UE 106 should process the DL RRC PDU.

In one embodiment, the arbitration function 602 implements an arbitration decision that is based upon first and second RRC messages from the first and second network (NW0 NW1) 100, 101, respectively, that each includes a profile based RRC reconfiguration message 730 including a profile ID that includes pre-defined and known components by the UE 106. In this implementation, instead of a NW 100, 101 specifying each and every parameter in the RRC reconfiguration message, a NW can provide a configuration ID. The configuration ID may be a profile ID which is pre-defined and known by the UE. In live networks it is known that there is not much variation in the RRC reconfiguration message content when the network reconfigures the UE during a data call. In particular, most of the reconfiguration message contents may remain the same and these can be particularly specified using profile IDs. As an example, in this implementation, when a profile ID based RRC reconfiguration is used by the two networks NW0 100 and NW1 101 and SIMs 604, 608, then the RRC process can serialize the message processing and the time to perform the steps of decoding, validation, and storage, will be reduced and thereby the pressure on the processing deadlines in the two RRCs will be reduced.

Figure 8:
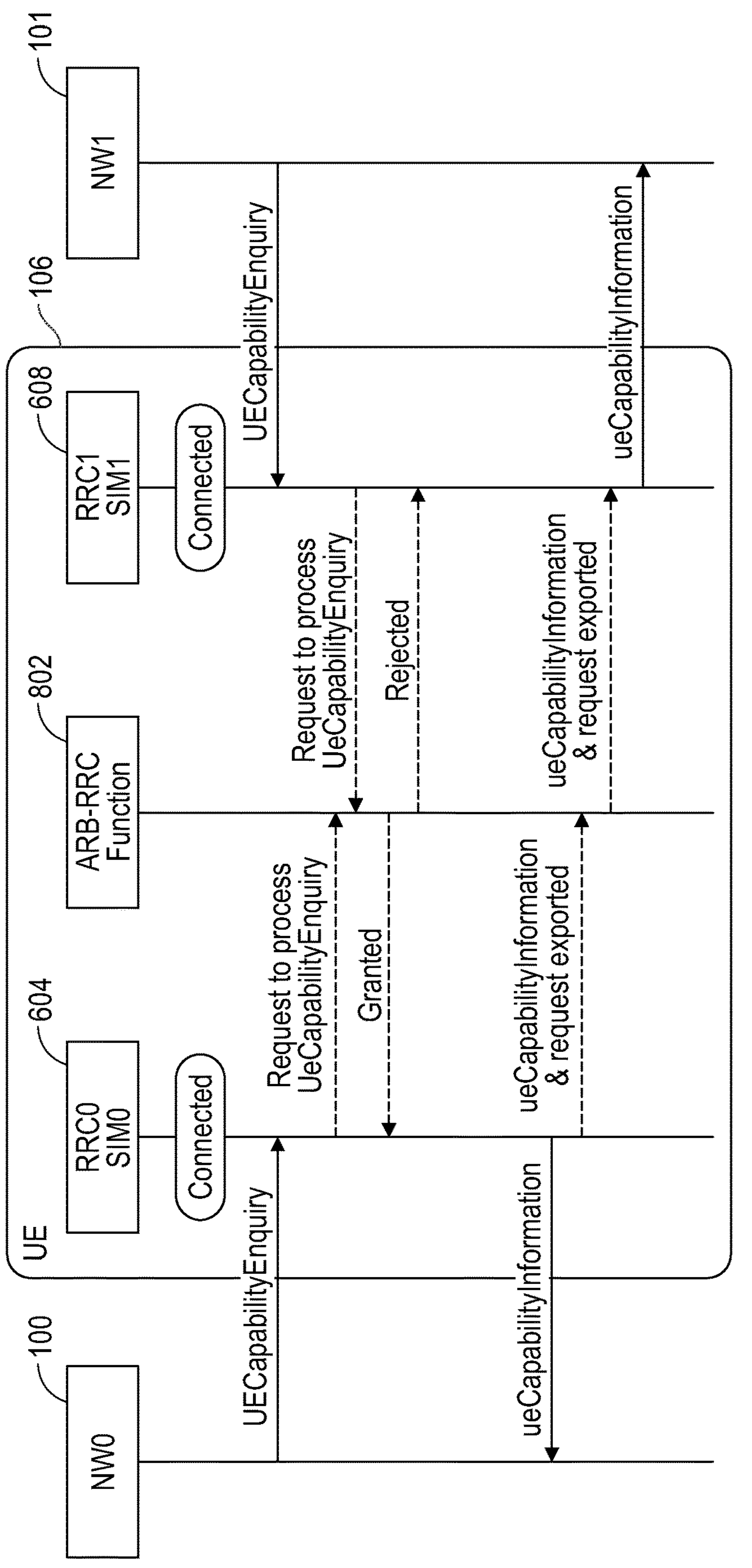
FIG. 8 illustrates an example diagram of a process for uplink (UL) parallel processing according to one embodiment of the disclosure.

With reference to FIG. 8, a method for uplink (UL) parallel processing is described. As can be seen in FIG. 8, first and second RRC messages (UE Capability Enquiries messages) are received from the first and second networks (NW0 100 and NW1 101), respectively, at the same time (or back to back i.e. while first RRC message is being processed second RRC message is received) by the UE 106 at SIM0 604 and SIM1 608. In this example, both the first and second networks (NW0 100 and NW1 101) are the same network operators. Based upon this SIM0 604 and SIM1 608 both submit a Request to process UE capability enquiries to the Arbitration RRC Function 802. The Arbitration RRC Function 802 then makes an arbitration decision to select one of the first or second SIM cards (604, 608) to process the UE Capability Enquiry and to determine the UE capability information. In this example, SIM0 604 is granted and SIM1 608 is rejected. In this example, the UE capability information is transmitted to NW0 100 and the UE capability information and request is exported to the other SIM card 608, and the UE capability information is transmitted to the other network NW1 101. In this way, that both SIM cards transport the UE capability information back to their respective networks.

This addresses one the most demanding use cases of responding to a UE-Capability Enquiry message being received at the same time on both SIMs. By exchanging the capability response between the two SIMs, the Arbitration RRC Function 802 decides which SIM can process the message. It is very likely that UE-Capability Enquiry request shall be same in both SIMs. Additionally, it should be appreciated that this method can be extended to any UL message and is not limited to UE Capability Enquiry and Information. For example, another UL message that can be served by this method may include such UL messages, such as, a measurement report.

Figure 9:
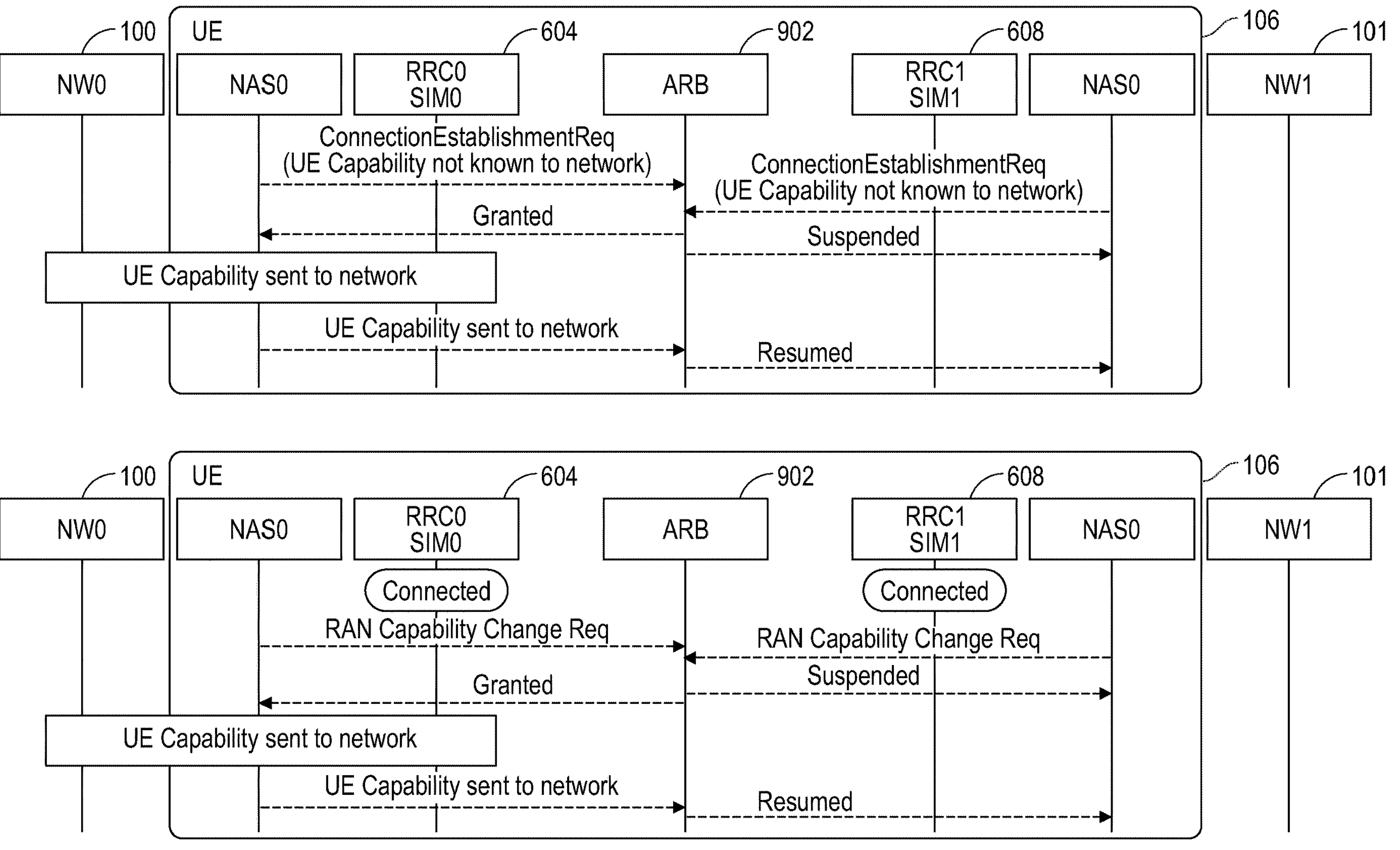
FIG. 9 illustrates another example diagram of a type of process for uplink (UL) parallel processing according to one embodiment of the disclosure.

With reference to FIG. 9, a method for uplink (UL) parallel processing is described. As can be seen in FIG. 9, first and second RRC messages (Connection Establishment Requests-when UE capability is not known to network) are received from the first and second networks (NW0 100 and NW1 101), received at the same time or approximately the same time by the UE 106, and both the first and second network are different network operators. Based upon this, the arbitration function 902 selects the first SIM 604, and grants permission to determine UE capability, and the UE capability is sent to the first network (NW 100). The arbitration function 902 also suspends the processing by second SIM1 608, while this occurs. The first SIM 604 then signals the arbitration function 902 that the UE capability has been sent NW0. The arbitration function 902 then sends a Resume signal to the second SIM1 608 such that it can resume operations and determine and send its UE capabilities to the second network NW1 101. It should be appreciated that this is one of the most demanding use cases as to responding to UE connection establishment request messages being received at the same time on both SIMs, when the networks are different. To ensure that the scenario of receiving UE connection establishment request messages on both SIMs does not arise, at the same time, as previously described, the process ensures that the two SIMs (SIM0 and SIM1) do not start the connection establishment at the same time.

With further reference to FIG. 9, a method for RAN capability change to be indicated to the network is described. As can be seen in FIG. 9, if the Non-access stratum (NAS) layer wants to indicate a RAN change, it can be serialized by the arbitration function 902 until one SIM completes the UE capability exchange with the network. As can be seen in FIG. 9, RAN capability change requests are transmitted for each SIM to the arbitration function 902. Based upon this, the arbitration function 902 selects one of the SIMS (e.g., the first SIM 604), and grants permission to determine and send the UE capability change-a RAN change to the first network (NW 100). The arbitration function 902 also suspends the processing by second SIM1 608, while this occurs. The first SIM 604 then signals the arbitration function 902 that the RAN change has been sent NW0. The arbitration function 902 then sends a Resume signal to the second SIM1 608 such that it can resume operations and determine and send its UE Capability-RAN change to the second network NW1 101.

Method and apparatus for scheduling RRC processing in an optimized manner for a DSDA UE to alleviate the processing time delay incurred in processing multiple messages serially and to minimize the impact to user experience have been described. In one example embodiment, previously described, a dual-SIM dual-active (DSDA) user equipment (UE) 106 connected to a plurality of networks (100, 101, etc.) can implement scheduling radio resource control (RRC) processing. In this embodiment, the previously described SOC 300 of the UE 106 may include a processor 302 that performs operations including: receiving a request to process a first RRC message for a first RRC task for a first SIM card 345 (SIM0) from a first network 100; receiving a request to process a second RRC message for a second RRC task for a second SIM card (SIM1) 346 from a second network 101; and performing an arbitration decision to decide whether to prioritize the implementation of the first RRC task for the first SIM card (SIM0) 346 or the second RRC task for the second SIM card (SIM1) 346.

Various implementation operations have been described that can be used independently or in a combined manner to alleviate the processing time delay incurred in processing the messages serially and to minimize the impact to user experience. The arbitration function previously described utilizes proposed prioritization methods to determine which SIM's message should be processed first. These arbitration implementations optimize the processing time by reusing the response created for one of the SIMs and applies it to the other SIM, in case both SIMs belong to same carrier, and when both SIMs have to transmit the same response to the network. One of the previously described implementations describes network-based options wherein the network can signal the priority of the processing in the DL RRC messages enabling UE-RRC to pre-empt processing of RRC message received on other SIM. Another implementation previously described, leverages the profile ID based reconfiguration signaling method to reduce the time by reducing the size of message and processing required thereof by using configuration stored in the UE.

It should be appreciated that the previously described methods and apparatuses implement the processes by processors and circuit components of the UE and network devices to implement the methods and processes. Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code. For example, the described operations may be stored as instructions on a non-transitory computer readable medium for execution by a computer.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMS, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting," "determining," "receiving," "forming," "grouping," "aggregating," "generating," "removing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method for scheduling radio resource control (RRC) processing for a dual-subscriber identity module (SIM) dual-active (DSDA) user equipment (UE) connected to a plurality of networks comprising:

receiving a request to process a first RRC message for a first RRC task for a first SIM card from a first network;

receiving a request to process a second RRC message for a second RRC task for a second SIM card from a second network; and performing an arbitration decision, wherein the arbitration decision implements a pre-emption based on an RRC message size process, to:

prioritize implementation of the first RRC task and suspend processing of the second RRC task, or prioritize implementation of the second RRC task and suspend processing of the first RRC task based on the second RRC message being of a larger size than the first RRC message while the RRC message is being processed, where the implementation of the second RRC task comprises processing the second RRC message, and wherein suspending processing of the first RRC task comprises pre-empting the first RRC message.

2. The method of claim 1, further comprising:

receiving a request to process a third RRC message for a third RRC task for the first SIM card from the first network;

receiving a request to process a fourth RRC message for a fourth RRC task for the second SIM card from the second network; and performing a second arbitration decision, wherein the second arbitration decision implements a first-in-first-out (FIFO) process, such that the third RRC task or the fourth RRC task, received first in time, is selected for prioritization and processed first.

3. The method of claim 1, further comprising:

receiving a request to process a third RRC message for a third RRC task for the first SIM card from the first network;

receiving a request to process a fourth RRC message for a fourth RRC task for the second SIM card from the second network; and performing a second arbitration decision, wherein the second arbitration decision implements a second pre-emption based on a priority process, such that, if the third RRC message is being processed, but the fourth RRC message is of a higher priority than the third RRC message, the third RRC message is pre-empted, and the fourth RRC message is processed, wherein resumption of the third RRC message processing occurs after completing handling of the fourth RRC message.

4. The method of claim 1, further comprising:

receiving a request to process a third RRC message for a third RRC task for the first SIM card from the first network;

receiving a request to process a fourth RRC message for a fourth RRC task for the second SIM card from the second network; and performing a second arbitration decision, wherein the second arbitration decision implements a second pre-emption based on a first application being run on the first or second SIM card, such that, if the first RRC message is being processed for a second application being run on the first SIM card, but a third application being run on the second SIM card is of a higher priority than the second application being run on the first SIM card, the third RRC message is pre-empted, and the fourth RRC message is processed.

5. The method of claim 4, wherein the third application being run on the second SIM card that is of the higher priority than the second application being run on the first SIM card includes at least one of: an emergency call, a mobility operation, or an ultra-reliable low latency (uRLLC) operation.

6. The method of claim 1, further comprising:

receiving a request to process a third RRC message for a third RRC task for the first SIM card from the first network;

receiving a request to process a fourth RRC message for a fourth RRC task for the second SIM card from the second network; and performing a second arbitration decision, wherein the second arbitration decision implements a network-based priority process, such that, if the third RRC message is being processed for the first SIM card, but a priority indicator for the fourth RRC message with a higher priority than a priority indicator for the third RRC message is received, the third RRC message is pre-empted, and the fourth RRC message is processed.

7. The method of claim 6, wherein the priority indicators for the third or fourth RRC messages are based on at least one of: size, priority content, application, or logical/transport/physical channel type(s).

8. The method of claim 6, wherein the priority indicators for the third or fourth RRC messages are added to a signaling radio bearer (SRB) service data unit (SDU) as part of a packet data convergence protocol (PDCP) header.

9. The method of claim 1, wherein the third and fourth RRC messages from the first and second networks, respectively, each comprise a profile-based RRC reconfiguration message including a profile identifier (ID) that includes pre-defined and components known by the DSDA UE.

10. The method of claim 1, further comprising:

receiving a request to process a third RRC message for a third RRC task for the first SIM card from the first network;

receiving a request to process a fourth RRC message for a fourth RRC task for the second SIM card from the second network; and performing a second arbitration decision, wherein, when the third and fourth RRC messages from the first and second networks, respectively, are both UE Capability Enquiries, received at a same time, and both the first and second networks are same network operators, then the second arbitration decision selects one of the first and second SIM cards to process a UE Capability Enquiry associated with the selected one of the first and second SIM cards and determine UE capability information, and the UE capability information is transmitted to an unselected one of the first and second SIM cards, such that both SIM cards transport the UE capability information back to their respective networks.

11. The method of claim 1, further comprising:

receiving a request to process a third RRC message for a third RRC task for the first SIM card from the first network;

receiving a request to process a fourth RRC message for a fourth RRC task for the second SIM card from the second network; and performing a second arbitration decision, wherein, when the third and fourth RRC messages from the first and second networks, respectively, are both UE Connection Establishment Requests, received at a same time, and both the first and second networks are different network operators, then the second arbitration decision selects one of the first and second SIM cards to process a first UE Connection Establishment Request associated with the selected one of the first and second SIM cards and to determine UE capability information for the selected one of the first and second SIM cards to be sent to a network associated with the selected one of the first and second SIM cards, while suspending a processing of a second UE Connection Establishment Request for an unselected one of the first and second SIM cards.

12. A dual-subscriber identity module (SIM) dual-active (DSDA) user equipment (UE) connected to a plurality of networks for scheduling radio resource control (RRC) processing, the DSDA UE comprising:

at least one antenna;

at least one radio, wherein the at least one radio is configured to communicate with a network of the plurality of networks, the network including a base station using the at least one antenna;

at least one processor coupled to the at least one radio and a first SIM card and a second SIM card, wherein the at least one processor is configured to perform operations comprising:

receiving a request to process a first RRC message for a first RRC task for the first SIM card from a first network;

receiving a request to process a second RRC message for a second RRC task for the second SIM card from a second network; and performing an arbitration decision, wherein the arbitration decision implements a pre-emption based on an RRC message size process, to:

prioritize implementation of the first RRC task and suspend processing of the second RRC task, or prioritize implementation of the second RRC task and suspend processing of the first RRC task based on the second RRC message being of a larger size than the first RRC message while the RRC message is being processed, where the implementation of the second RRC task comprises processing the second RRC message, and wherein suspending processing of the first RRC task comprises pre-empting the first RRC message.

13. The DSDA UE of claim 12, wherein the operations further comprise:

receiving a request to process a third RRC message for a third RRC task for the first SIM card from the first network;

receiving a request to process a fourth RRC message for a fourth RRC task for the second SIM card from the second network; and performing a second arbitration decision, wherein the second arbitration decision implements a first-in-first-out (FIFO) process, such that the third RRC task or the fourth RRC task, received first in time, is selected for prioritization and processed first.

14. The DSDA UE of claim 12, wherein the operations further comprise:

receiving a request to process a third RRC message for a third RRC task for the first SIM card from the first network;

receiving a request to process a fourth RRC message for a fourth RRC task for the second SIM card from the second network; and performing a second arbitration decision, wherein the second arbitration decision implements a second pre-emption based on a priority process, such that, if the third RRC message is being processed, but the fourth RRC message is of a higher priority than the third RRC message, the third RRC message is pre-empted, and the fourth RRC message is processed, wherein resumption of the third RRC message processing occurs after completing handling of the fourth RRC message.

15. The DSDA UE of claim 12, wherein the operations further comprise:

receiving a request to process a third RRC message for a third RRC task for the first SIM card from the first network;

receiving a request to process a fourth RRC message for a fourth RRC task for the second SIM card from the second network; and performing a second arbitration decision, wherein the second arbitration decision implements a second pre-emption based on a first application being run on the first or second SIM card, such that, if the first RRC message is being processed for a second application being run on the first SIM card, but a third application being run on the second SIM card is of a higher priority than the second application being run on the first SIM card, the third RRC message is pre-empted, and the fourth RRC message is processed.

16. The DSDA UE of claim 15, wherein the third application being run on the second SIM card that is of the higher priority than the second application being run on the first SIM card includes at least one of: an emergency call, a mobility operation, or an ultra-reliable low latency (uRLLC) operation.

17. The DSDA UE of claim 12, wherein the operations further comprise:

receiving a request to process a third RRC message for a third RRC task for the first SIM card from the first network;

receiving a request to process a fourth RRC message for a fourth RRC task for the second SIM card from the second network; and performing a second arbitration decision, wherein the second arbitration decision implements a network-based priority process, such that, if the third RRC message is being processed for the first SIM card, but a priority indicator for the fourth RRC message with a higher priority than a priority indicator for the third RRC message is received, the third RRC message is pre-empted, and the fourth RRC message is processed.

18. The DSDA UE of claim 17, wherein the priority indicators for the third or fourth RRC messages are based on at least one of: size, priority content, application, or logical/transport/physical channel type(s).

19. The DSDA UE of claim 17, wherein priority indicators for the third or fourth RRC messages are added to a signaling radio bearer (SRB) service data unit (SDU) as part of a packet data convergence protocol (PDCP) header.

20. The DSDA UE of claim 12, wherein the third and fourth RRC messages from the first and second networks, respectively, each comprise a profile-based RRC reconfiguration message including a profile identifier (ID) that includes pre-defined and components known by the DSDA UE.

21. The DSDA UE of claim 12, wherein the operations further comprise:

receiving a request to process a third RRC message for a third RRC task for the first SIM card from the first network;

receiving a request to process a fourth RRC message for a fourth RRC task for the second SIM card from the second network; and performing a second arbitration decision, wherein, when the third and fourth RRC messages from the first and second networks, respectively, are both UE Capability Enquiries, received at a same time, and both the first and second networks are same network operators, then the second arbitration decision selects one of the first and second SIM cards to process a UE Capability Enquiry associated with the selected one of the first and second SIM cards and determine UE capability information, and the UE capability information is transmitted to an unselected one of the first and second SIM cards, such that both SIM cards transport the UE capability information back to their respective networks.

22. The DSDA UE of claim 12, wherein the operations further comprise:

receiving a request to process a third RRC message for a third RRC task for the first SIM card from the first network;

receiving a request to process a fourth RRC message for a fourth RRC task for the second SIM card from the second network; and performing a second arbitration decision, wherein, when the third and fourth RRC messages from the first and second networks, respectively, are both UE Connection Establishment Requests, received at a same time, and both the first and second networks are different network operators, then the second arbitration decision selects one of the first and second SIM cards to process a first UE Connection Establishment Request associated with the selected one of the first and second SIM cards and to determine UE capability information for the selected one of the first and second SIM cards to be sent to a network associated with the selected one of the first and second SIM cards, while suspending a processing of a second UE Connection Establishment Request for an unselected one of the first and second SIM cards.

* * * * *